US008204714B2

(12) United States Patent
Lu

(10) Patent No.: US 8,204,714 B2
(45) Date of Patent: Jun. 19, 2012

(54) METHOD AND COMPUTER PROGRAM PRODUCT FOR FINDING STATISTICAL BOUNDS, CORRESPONDING PARAMETER CORNERS, AND A PROBABILITY DENSITY FUNCTION OF A PERFORMANCE TARGET FOR A CIRCUIT

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 12/713,210

(22) Filed: Feb. 26, 2010

(65) Prior Publication Data
US 2011/0213587 A1    Sep. 1, 2011

(51) Int. Cl.
G06F 17/18    (2006.01)
G06F 19/00    (2011.01)

(52) U.S. Cl. .................................. 702/181; 702/179
(58) Field of Classification Search .................. 702/181, 702/179, 180, 85, 182
See application file for complete search history.

(56) References Cited

U.S. PATENT DOCUMENTS

| | | | |
|---|---|---|---|
| 6,018,623 A | 1/2000 | Chang et al. | |
| 6,901,570 B2 | 5/2005 | Lu | |
| 2006/0100873 A1 | 5/2006 | Bittner et al. | |

OTHER PUBLICATIONS

B. W. Curran, et al., IBM eServer z900 high-frequency microprocessor technology, circuits, and design methodology, IBM Journal of Research and Development, vol. 46, Nos. 4/5, 2002.
N. Boffoli and D. Caivano, "Toward a Process Monitoring Automation: a Proposal", IEEE CSMR2007, Special session on system quality and maintainability.
"Numerical Recipes in C", 2nd edition, W. H. Press, S. A. Teukolsky, W. T. Vetterling, and B. P. Flannery, Cambridge University Press, 1997.

Primary Examiner — Michael Nghiem
Assistant Examiner — Manuel Rivera Vargas
(74) Attorney, Agent, or Firm — Gibb I.P. law Firm, LLC; David A. Cain, Esq.

(57) ABSTRACT

Disclosed are embodiments of a method and an associated computer program product for finding the statistical bounds, the corresponding parameter corners and the probability density function of one or more performance targets for a circuit without requiring Monte Carlo simulation runs. To accomplish this, a joint probability density function for independent parameters that affect the performance target can be constructed. Then, based on the joint probability density function, the statistical bounds of the performance target can be found by constructing an equal-probability-density surface of the joint probability density function and solving a constrained optimization problem on that equal-probability-density surface. Once the statistical bounds are determined, the corresponding parameter corners for the performance target can also be determined. After obtaining multiple statistical bounds corresponding to different accumulated probability density, the probability density function of the performance target can also be obtained.

25 Claims, 13 Drawing Sheets

METHOD AND COMPUTER PROGRAM PRODUCT FOR FINDING STATISTICAL BOUNDS, CORRESPONDING PARAMETER CORNERS, AND A PROBABILITY DENSITY FUNCTION OF A PERFORMANCE TARGET FOR A CIRCUIT

BACKGROUND

1. Field of the Invention

The present invention relates generally to device design and, more particularly, to a method and computer program product for efficiently and accurately finding the statistical bounds, the corresponding parameter corners, and the probability density function of one or more performance targets for a circuit.

2. Description of the Related Art

Parameters of circuits of the same design, including parameters of specific components of the circuit (e.g., of integrated circuits, of semiconductor devices, of interconnect structures, etc.), will often differ in random ways (e.g., due to random process variations). Thus, circuit performance will also differ. To ensure that a circuit will achieve a given performance target when manufactured, designers often use a simulator to determine the statistical distribution (e.g., a histogram distribution plot) and the statistical bounds (i.e., the lower and upper statistical bounds) and corresponding parameter corners for the performance target. Typical simulators (e.g., Simulation Program with Integrated Circuit Emphasis (SPICE) simulators), associated compact models and other electronic design automation (EDA) tools support Monte Carlo (MC) simulations. Unfortunately, when Monte Carlo simulations are used to determine the probability density function, the statistical bounds and the corresponding parameter corners of a performance target, a very large number of simulation runs must be performed and the results may not be as accurate as required. Therefore, there is a need in the art for a method for efficiently and accurately finding the statistical bounds, the corresponding parameter corners, and the probability density function (i.e., the statistical probability distributions) of one or more performance targets of a circuit.

SUMMARY

In view of the foregoing, disclosed herein are embodiments of a computer-implemented method for efficiently and accurately finding the lower and upper statistical bounds, the corresponding parameter corners and the probability density function (PDF) of one or more performance targets of a circuit without requiring Monte Carlo simulation runs. For example, the method can be used to find one or more specific performance targets of a specific circuit component, such as an integrated circuit, a semiconductor device, an interconnect structure, etc.

To accomplish this, a joint probability density function for independent parameters that affect a performance target of the circuit can be constructed. Then, based on the joint probability density function, a pair of statistical bounds of the performance target can be found by constructing a proper equal-probability-density surface of the joint probability density function and solving a constrained optimization problem on that equal-probability-density surface. Once a statistical bound is determined, the corresponding parameter corners for the performance target can also be determined. After multiple pairs of statistical bounds for multiple different equal-probability-density surfaces are determined, an accumulated probability density (APD) of the performance target can be determined. Lastly, the corresponding probability density function can be determined.

More particularly, disclosed herein are embodiments of a method of finding lower and upper statistical bounds for a pair of given accumulated probabilities of a performance target F of a circuit and, specifically, of a specific performance target F of a specific circuit component (e.g., an integrated circuit, a semiconductor device, an interconnect structure, etc.) affected by M independent statistical model parameters ($x_1, x_2, \ldots, x_M$), where M is an integer.

In one embodiment, the method can comprise determining (e.g., by a computer) a nominal value $x_{j0}$, a standard deviation $\sigma_j$, and a probability density function $\tilde{p}(x_j; x_{j0}, \sigma_j)$ for each parameter $x_j$, where $j=1, 2, \ldots, M$. Next, a joint probability density function $\tilde{P}(x_1, x_2, \ldots, x_M)$ can be constructed (e.g., by the computer) for all of the M independent statistical model parameters ($x_1, x_2, \ldots, x_M$), where $$\tilde{P}(x_1, x_2, \ldots, x_M) = \prod_{j=1}^{M} \tilde{p}(x_j; x_{j0}, \sigma_j).$$

Then, based on this joint probability density function $\tilde{P}(x_1, x_2, \ldots, x_M)$, a pair of statistical bounds of the performance target F, as defined by a symmetric interval from a lower statistical bound $-K\sigma$ to an upper statistical bound $+K\sigma$, can be determined (e.g., by the computer) by performing the following: constructing a $K\sigma$ equal-probability-density surface, $S(x_1, x_2, \ldots, x_M; K)=0$, i.e., $\tilde{P}(x_1, x_2, \ldots, x_M)|_{S(x;K)=0}$=const, of the joint probability density function $\tilde{P}(x_1, x_2, \ldots, x_M)$ and solving a constrained optimization problem on the $K\sigma$ equal-probability-density surface $S(x_1, x_2, \ldots, x_M; K)=0$ to determine the lower statistical bound $-K\sigma$ and the upper statistical bound $+K\sigma$.

In another embodiment, the method can similarly comprise determining (e.g., by a computer) a nominal value $x_{j0}$, a standard deviation $\sigma_j$, and a probability density function $\tilde{p}(x_j; x_{j0}, \sigma_j)$ for each parameter $x_j$, where $j=1, 2, \ldots, M$. However, in this embodiment subsequent steps are simplified by first normalizing (e.g., by the computer) the M independent statistical model parameters ($x_1, x_2, \ldots, x_M$) to create M normalized parameters ($u_1, u_2, \ldots, u_M$). Next, a joint probability density function $P(u_1, u_2, \ldots, u_M)$ can be constructed (e.g., by the computer) for all of the M normalized parameters ($u_1, u_2, \ldots, u_M$), where $$P(u_1, u_2, \ldots, u_M) = \prod_{j=1}^{M} p(u_j)$$

and $u_j=(x_j-x_{j0})/\sigma_j$. Then, based on the joint probability density function $P(u_1, u_2, \ldots, u_M)$, a pair of statistical bounds of the performance target F, as defined by a symmetric interval from a lower statistical bound $-K\sigma$ to an upper statistical bound $+K\sigma$, are determined (e.g., by the computer) by performing the following: constructing a $K\sigma$ equal-probability-density surface, $s(u_1, u_2, \ldots, u_M; K)=0$, $P(u_1, u_2, \ldots, u_M)|_{s(u;K)=0}$=const, of the second joint probability density function $P(u_1, u_2, \ldots, u_M)$ and solving a constrained optimization problem on the $K\sigma$ equal-probability-density surface $s(u_1, u_2, \ldots, u_M; K)=0$ to determine the lower statistical bound $-K\sigma$ and the upper statistical bound $+K\sigma$.

Those skilled in the art will recognize that, in each of the above-described method embodiments, solving the constrained optimization problem directly can be quite complex.

To avoid this complexity, the constrained optimization problem can first be converted into an unconstrained optimization problem. Different techniques can be used for this conversion process (e.g., by eliminating a parameter, or by adding a parameter, etc.). Then, the unconstrained optimization problem can be solved to determine the lower statistical bound $-K\sigma$ and the upper statistical bound $+K\sigma$. Once the lower and upper statistical bounds are determined, the corresponding parameter corners for the performance target can also be determined.

Also disclosed herein are embodiments of a computer program product. The computer program product can comprise a computer readable storage medium having computer readable program code embodied therewith. This computer readable program code can be configured to perform any of the above-described methods of finding lower and upper statistical bounds for a performance target F of a circuit and, specifically, of a specific performance target F of a specific circuit component (e.g., an integrated circuit, a semiconductor device, an interconnect structure, etc.) affected by M independent statistical model parameters $(x_1, x_2, \ldots, x_M)$, where M is an integer.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

Parameters of circuits of the same design, including parameters of the specific components of the circuit (e.g., of integrated circuits, of semiconductor devices, of interconnect structures, etc.) will often differ in random ways (e.g., due to random process variations). Thus, circuit performance will also differ. To ensure that a circuit will achieve a given performance target when manufactured, designers often use a simulator to determine the statistical/probability distribution and the statistical bounds (i.e., the lower and upper statistical bounds) and corresponding parameter corners for the performance target. Typical simulators (e.g., Simulation Program with Integrated Circuit Emphasis (SPICE) simulators), associated compact models and other electronic design automation (EDA) tools support Monte Carlo (MC) simulations. Unfortunately, when Monte Carlo-based simulators are used to determine the probability density function, the statistical bounds and the corresponding parameter corners of a performance target, a very large number of simulation runs must be performed and the results may not be as accurate are required.

In view of the foregoing, disclosed herein are embodiments of a computer-implemented method for efficiently and accurately finding the lower and upper statistical bounds (e.g., 0.135% to 99.865%, 1% to 99%, 5% to 95%, 10% to 90%, 20% to 80%, 30% to 70%, 40% to 60%, etc.), the corresponding parameter corners and the probability density function of one or more performance targets for a circuit without requiring Monte Carlo simulation runs. For example, the method can be used to find one or more specific performance targets of a specific circuit component, such as an integrated circuit, a semiconductor device, an interconnect structure, etc.

To accomplish this, a joint probability density function for independent parameters that affect the performance target can be constructed. Then, based on the joint probability density function, a pair of statistical bounds of the performance target can be found by constructing a proper equal-probability-density surface of the joint probability density function and solving a constrained optimization problem on that equal-probability-density surface. Once a statistical bound is determined, the corresponding parameter corners (i.e., the off-set) for the performance target can also be determined. After multiple pairs of statistical bounds for multiple different equal-probability-density surfaces are determined, an accumulated probability density of a performance target can be determined. Lastly, the corresponding probability density function can be determined.

Figure 1:
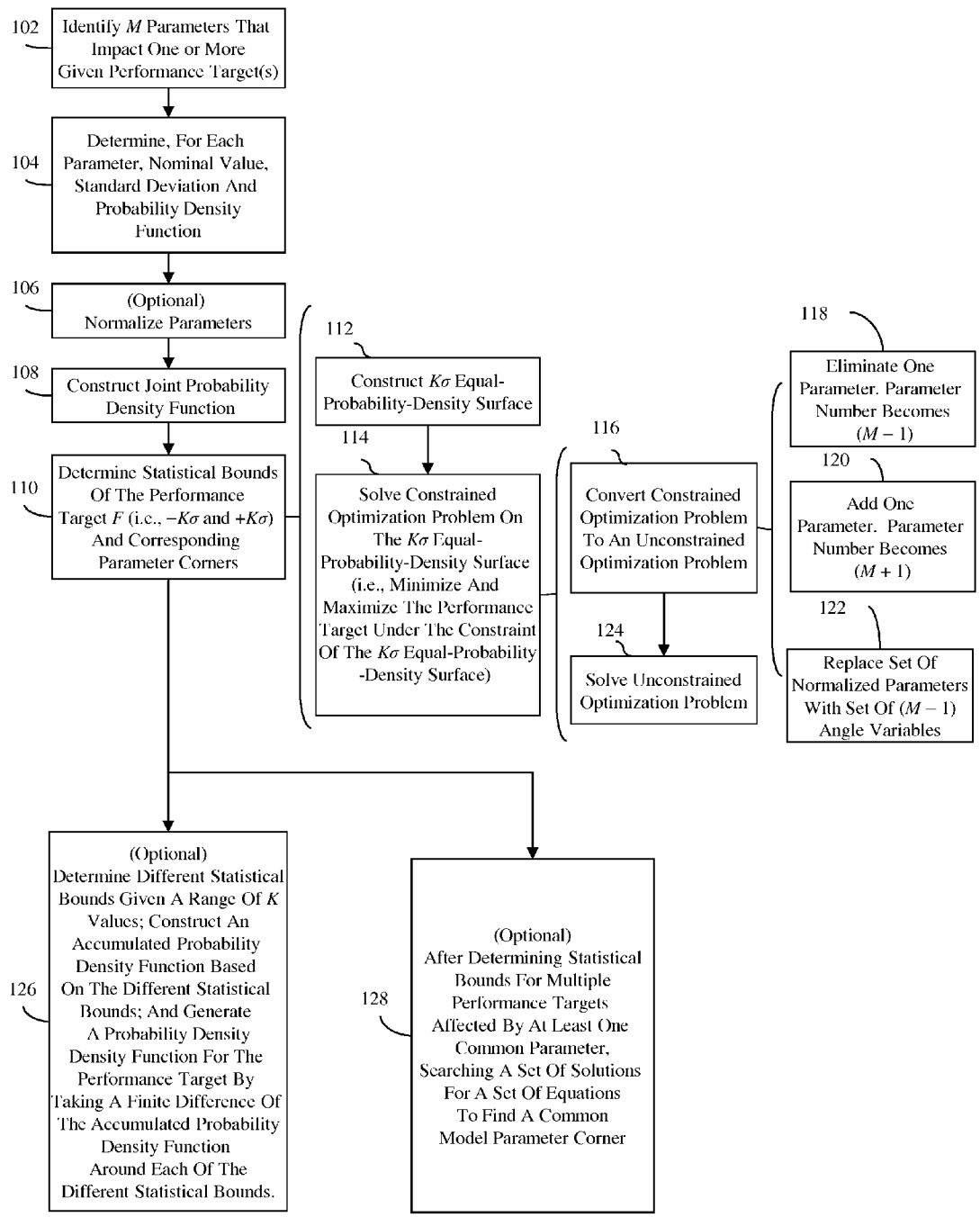
FIG. 1 is a flowchart illustrating embodiments of a method according to the present invention.

More particularly, referring to the flow chart of FIG. 1, disclosed herein are embodiments of a method of finding lower and upper statistical bounds for a pair of given accumulated probabilities of a performance target F of a circuit and, specifically, of a specific performance target F of a specific circuit component (e.g., an integrated circuit, a semiconductor device, an interconnect structure, etc.) affected by M independent statistical model parameters $(x_1, x_2, \ldots, x_M)$, where M is an integer. Thus, in each of the embodiment, the method can comprise first identifying a given performance target F and the M independent statistical model parameters that affect that performance target F (102). For example, a performance target for unit-length resistance r of an interconnect wire can be affected by the independent statistical model parameters of wire width (w) and sheet resistance ($R_s$). A performance target for interconnect resistance R can be affected by wire width w and wire thickness t. A performance target for interconnect capacitance C can be affected by wire width w, wire thickness t, line-to-line space $s_L$ and $s_R$, interlevel distance (ILD) to the metal level above d, and interlevel distance h. It should be understood that these examples are provided for illustration purposes and are not intended to be limiting.

Additionally, in each of the embodiments, the method can comprise determining a nominal value $x_{j0}$ (i.e., a mean value), a standard deviation $\sigma_j$, and a probability density function $\tilde{p}(x_j; x_{j0}, \sigma_j)$ for each parameter $x_j$, where j=1, 2, ..., M (104). The probability density function $\tilde{p}(x_j; x_{j0}, \sigma_j)$ is a one-dimensional probability density function. A typical example of such a one-dimensional probability density function is a Gaussian distribution, for which the distribution is also peaked at $x=x_0$ and decreases monotonically with increasing $|x-x_0|$. Techniques for determining a nominal value $x_{j0}$ (i.e., a mean value), a standard deviation $\sigma_j$, and a probability density function $\tilde{p}(x_j; x_{j0}, \sigma_j)$ for a circuit parameter (e.g., of an integrated circuit parameter, a semiconductor device parameter, an interconnect structure parameter, etc.) are well known in the art. Thus, the details are omitted from this specification in order to allow the reader to focus on the salient aspects of the embodiments described.

In one embodiment, the method can further comprising constructing a joint probability density function $\tilde{P}(x_1, x_2, \ldots, x_M)$ for all of the M independent statistical model parameters $(x_1, x_2, \ldots, x_M)$, where $$\tilde{P}(x_1, x_2, \ldots, x_M) = \prod_{j=1}^{M} \tilde{p}(x_j; x_{j0}, \sigma_j). \quad (108)$$

If the probability density functions $\tilde{p}(x_1, x_2, \ldots, x_M)$ are Gaussian distributions, then the joint probability density function $\tilde{P}(x_1, x_2, \ldots, x_M)$ can be given by the following expression:

$$\tilde{P}(x_1, x_2, \ldots, x_M) = \left( \prod_{j=1}^{M} \frac{1}{\sqrt{2\pi}\,\sigma_j} \right) \exp\left[ -\frac{1}{2} \sum_{j=1}^{M} \left( \frac{x_j - x_{j0}}{\sigma_j} \right)^2 \right].$$

Then, based on this joint probability density function $\tilde{P}(x_1, x_2, \ldots, x_M)$, a pair of statistical bounds of the performance target F, as defined by a symmetric interval from a lower statistical bound $-K\sigma$ to an upper statistical bound $+K\sigma$, can be determined (110). It should be noted that the value for K is preselected so that a pair of given percentages of accumulated probability density for the performance target F will fall within the symmetric interval of from $-K\sigma$ to $+K\sigma$. For example, K=3 can be used to find the 0.135% to 99.865% statistical bounds, K=2.33 can be used to find the 1% to 99% statistical bounds, K=1.64 can be used to find the 5% to 95% statistical bounds, K=1.28 can be used to find the 10% to 90% statistical bounds, K=0.842 can be used to find the 20% to 80% statistical bounds, K=0.524 can be used to find the 30% to 70% statistical bounds, and K=0.253 can be used to find the 40% to 60% statistical bounds.

Figure 2:
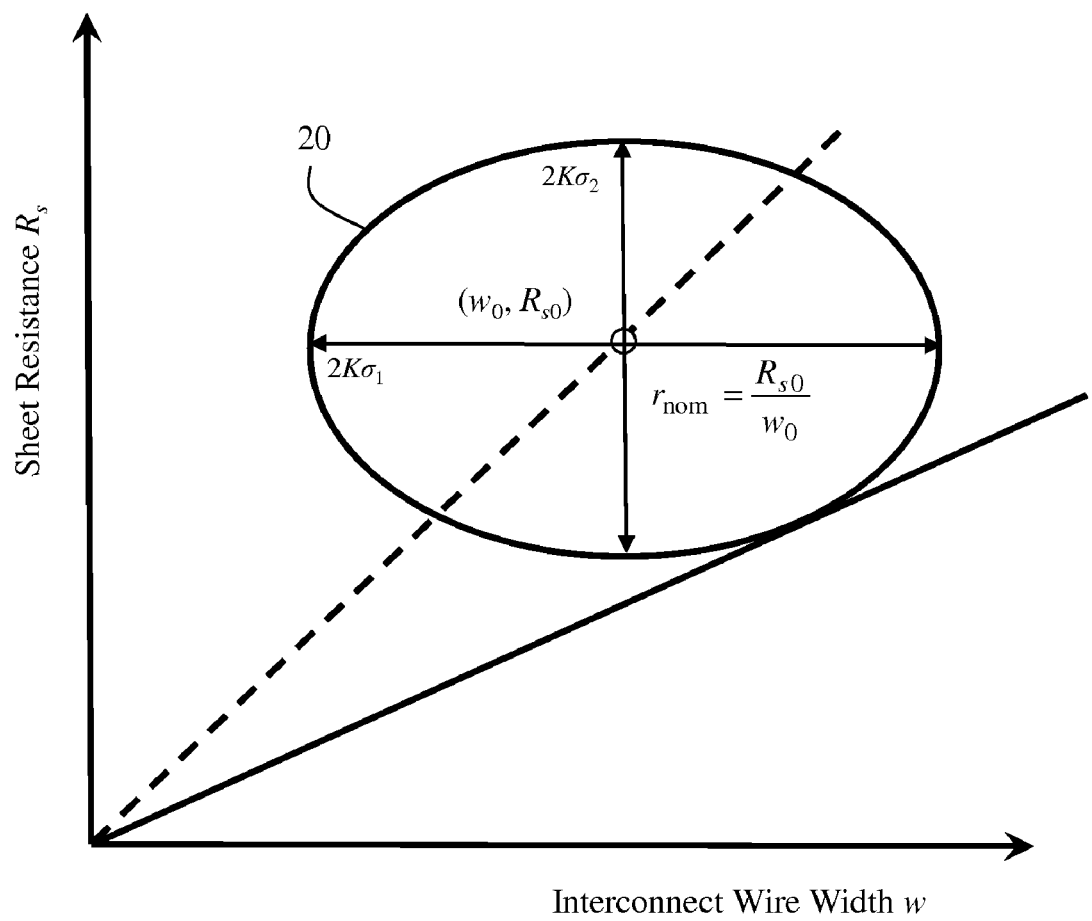
FIG. 2 is a graph illustrating a K$\sigma$ equal-probability-density surface $S(x_1, x_2, \ldots, x_M; K)=0$.
Figure 3:
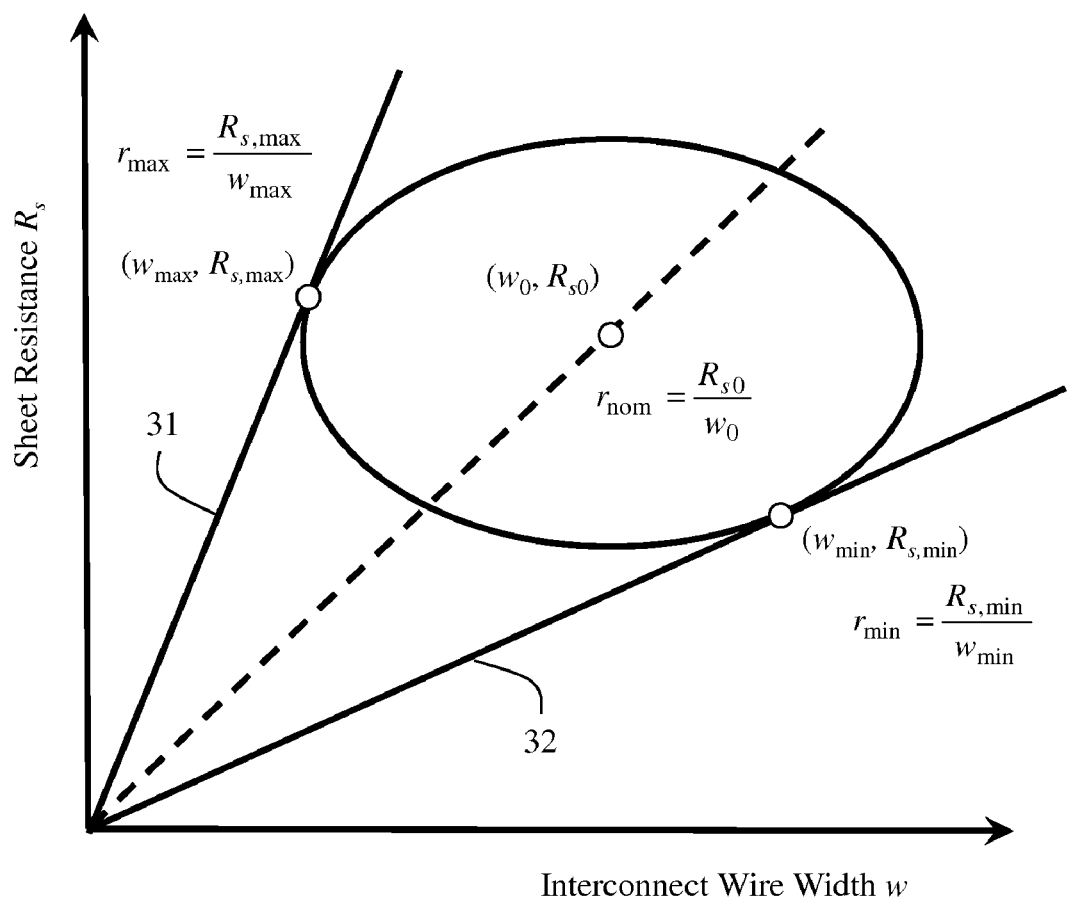
FIG. 3 is a graph illustrating the K$\sigma$ equal-probability-density surface $S(x_1, x_2, \ldots, x_M; K)=0$ of FIG. 2 with tangent lines indicating lower statistical bound $-K\sigma$ and upper statistical bound $+K\sigma$.

Specifically, to determine the lower and upper statistical bounds, a $K\sigma$ equal-probability-density surface $S(x_1, x_2, \ldots, x_M; K)=0$ of the joint probability density function $\tilde{P}(x_1, x_2, \ldots, x_M)$ can be constructed (112). It should be noted that, geometrically, this equal-probability surface $S(x_1, x_2, \ldots, x_M; K)=0$ is an ellipse when M=2, or an ellipsoid in the three-dimensional space $(x_1, x_2, x_3)$ when M=3, or a hyperellipsoid in the M-dimensional space $(x_1, x_2, \ldots, x_M)$, $$\sum_{j=1}^{M} (x_j - x_{j0})^2 / \sigma_j^2 = K^2$$

when M>3. For example, FIG. 2 illustrates an ellipse 20 $K\sigma$ equal-probability-density surface $S(x_1, x_2, \ldots, x_M; K)=0$ of the joint probability density function $\tilde{P}(x_1, x_2, \ldots, x_M)$ for a unit-length resistance r of an interconnect wire affected by 2 independent statistical model parameters: interconnect wire width (w) and sheet resistance ($R_s$). The ellipse 20 is centered at ($w_0$, $R_{s0}$) with two semi-axis of $K\sigma_1$ and $K\sigma_2$. Then, a constrained optimization problem can be solved on the $K\sigma$ equal-probability-density surface $S(x_1, x_2, \ldots, x_M; K)=0$ to determine the lower statistical bound $-K\sigma$ and the upper statistical bound $+K\sigma$ (114). Solving the constrained optimization problem at process 114 comprises minimizing the performance target F under the constraint $$\sum_{j=1}^{M} (x_j - x_{j0})^2 / \sigma_j^2 = K^2$$

to determine the lower statistical bound $-K\sigma$ and similarly maximizing the performance target F under the constraint $$\sum_{j=1}^{M} (x_j - x_{j0})^2 / \sigma_j^2 = K^2$$

to determine the upper statistical bound $+K\sigma$. As illustrated in FIG. 3, maximizing the unit-length resistance r under the constraint of being on the ellipse 20 leads to one of the tangent lines 31 to the ellipse 20 and minimizing the resistance under this constraint of being on the ellipse leads to the other tangent line 32 of the ellipse 20.

Those skilled in the art will recognize that solving such a constrained optimization problem directly can be quite complex. To avoid this complexity, the constrained optimization problem can first be converted into an unconstrained optimization problem (116). Different techniques can be used for this conversion process.

For example, the constrained optimization problem can be converted into an unconstrained optimization problem by eliminating one of the M independent statistical model parameters $(x_1, x_2, \ldots, x_M)$, such as the $n^{th}$ parameter such that $$x_n = x_{n0} \pm \sigma_j \sqrt{K^2 - \sum_{j=1, j \neq n}^{M} (x_j - x_{j0})^2 / \sigma_j^2},$$

n=1, 2, 3, ..., M (118). The plus sign (+) is for one of the upper and lower bounds, and the minus sign (−) is for the other bound. Then, the unconstrained optimization problem can be solved by minimizing the performance target F without the constraint to determine the lower statistical bound $-K\sigma$ and maximizing the performance target F without the constraint to determine the upper statistical bound $+K\sigma$ (124). For example, if the last normalized parameter is eliminated, then the problem becomes $$F_- = F\left(x_1, x_2, \ldots, x_{M-1}, \mp\sqrt{K^2 - \sum_{j=1}^{M-1}(x_j - x_{j0})^2/\sigma_j^2}\right)$$

for minimizing the performance target F and $$F_+ = F\left(x_1, x_2, \ldots, x_{M-1}, \pm\sqrt{K^2 - \sum_{j=1}^{M-1}(x_j - x_{j0})^2/\sigma_j^2}\right)$$

for maximizing the performance target F. Each of these is an optimization problem in the (M−1) dimensional space. Then, the unconstrained optimization problem can be solved by minimizing the performance target F without the constraint to determine the lower statistical bound $-K\sigma$ and maximizing the performance target F without the constraint to determine the upper statistical bound $+K\sigma$ (124).

Alternatively, the constrained optimization problem can be converted into an unconstrained optimization problem by adding an additional parameter to the M independent statistical model parameters $(x_1, x_2, \ldots, x_M)$ (120). This can be done to minimize or maximize the following target function in an (M+1) dimensional space:

$$T(x_1, x_2, \ldots, x_M, \lambda) = F(x_1, x_2, \ldots, x_M) - \frac{1}{2}\lambda\left(\sum_{j=1}^{M}\frac{(x_j - x_{j0})^2}{\sigma_j^2} - K^2\right)$$

It should be noted that, in this case, setting the partial derivative of T with respect to $\lambda$ to zero, leads to $$\frac{\partial T}{\partial \lambda} = -\frac{1}{2}\left(\sum_{j=1}^{M}\frac{(x_j - x_{j0})^2}{\sigma_j^2} - K^2\right) = 0.$$

Then, the unconstrained optimization problem can be solved by minimizing the performance target F without the constraint to determine the lower statistical bound $-K\sigma$ and maximizing the performance target F without the constraint to determine the upper statistical bound $+K\sigma$ (124).

In another embodiment, the method can similarly comprise determining a nominal value $x_{j0}$, a standard deviation $\sigma_j$, and a probability density function $\tilde{p}(x_j; x_{j0}, \sigma_j)$ for each parameter $x_j$, where $j=1, 2, \ldots, M$ (104). However, in this embodiment subsequent steps are simplified by first normalizing the M independent statistical model parameters $(x_1, x_2, \ldots, x_M)$ to create M normalized parameters $(u_1, u_2, \ldots, u_M)$ (106). Normalizing refers to a process of re-scaling the variables so that the coordinates have values that fall within the same range (e.g., $-3$ to $+3$ for $3\sigma$ range). In this case, the performance target $F=F(x_1, x_2, \ldots, x_M)=f(u_1, u_2, \ldots, u_M)$. Techniques for normalizing coordinates are well-known in the art. For example, $u_j=(x_j-x_{j0})/\sigma_j$, $j=1, 2, \ldots, M$.

Next, a joint probability density function $P(u_1, u_2, \ldots, u_M)$ can be constructed for all of the M normalized parameters $(u_1, u_2, \ldots, u_M)$, where $$P(u_1, u_2, \ldots, u_M) = \prod_{j=1}^{M} p(u_j). \tag{108}$$

In this case, if the probability density functions $\tilde{p}(x_j; x_{j0}, \sigma_j)$ are Gaussian distributions, then the joint probability density function $P(u_1, u_2, \ldots, u_M)$ can be given by the following expression:

$$P(u_1, u_2, \ldots, u_M) = \frac{1}{(2\pi)^{M/2}}\exp\left(-\frac{1}{2}\sum_{j=1}^{M}u_j^2\right),$$

where $u_j=(x_j-x_{j0})/\sigma_j$. As a result, the nominal value (i.e., mean value) of $p(u)=0$ and the standard deviation $\sigma=1$.

Then, based on the joint probability density function $P(u_1, u_2, \ldots, u_M)$, a pair of statistical bounds of the performance target F, as defined by a symmetric interval from a lower statistical bound $-K\sigma$, to an upper statistical bound $+K\sigma$, are determined (110). As in the embodiment described above, the value for K is preselected so that a pair of given percentages of accumulated probability density for the performance target F will fall within the symmetric interval of from $-K\sigma$ to $+K\sigma$. For example, K=3 can be used to find the 0.135% to 99.865% statistical bounds, K=2.33 can be used to find the 1% to 99% statistical bounds, K=1.64 can be used to find the 5% to 95% statistical bounds, K=1.28 can be used to find the 10% to 90% statistical bounds, K=0.842 can be used to find the 20% to 80% statistical bounds, K=0.524 can be used to find the 30% to 70% statistical bounds, and K=0.253 can be used to find the 40% to 60% statistical bounds.

Figure 4:
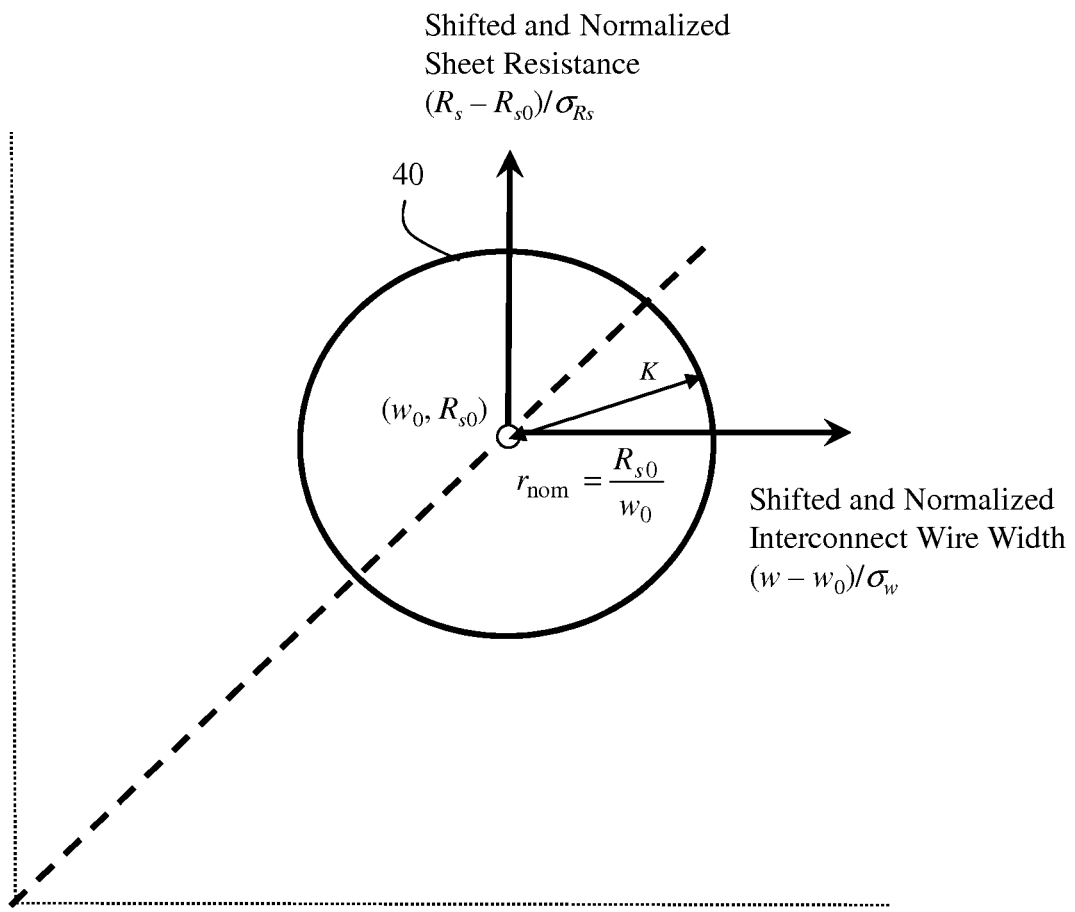
FIG. 4 is a graph illustrating a K$\sigma$ equal-probability-density surface $s(u_1, u_2, \ldots, u_M; K)=0$.
Figure 5:
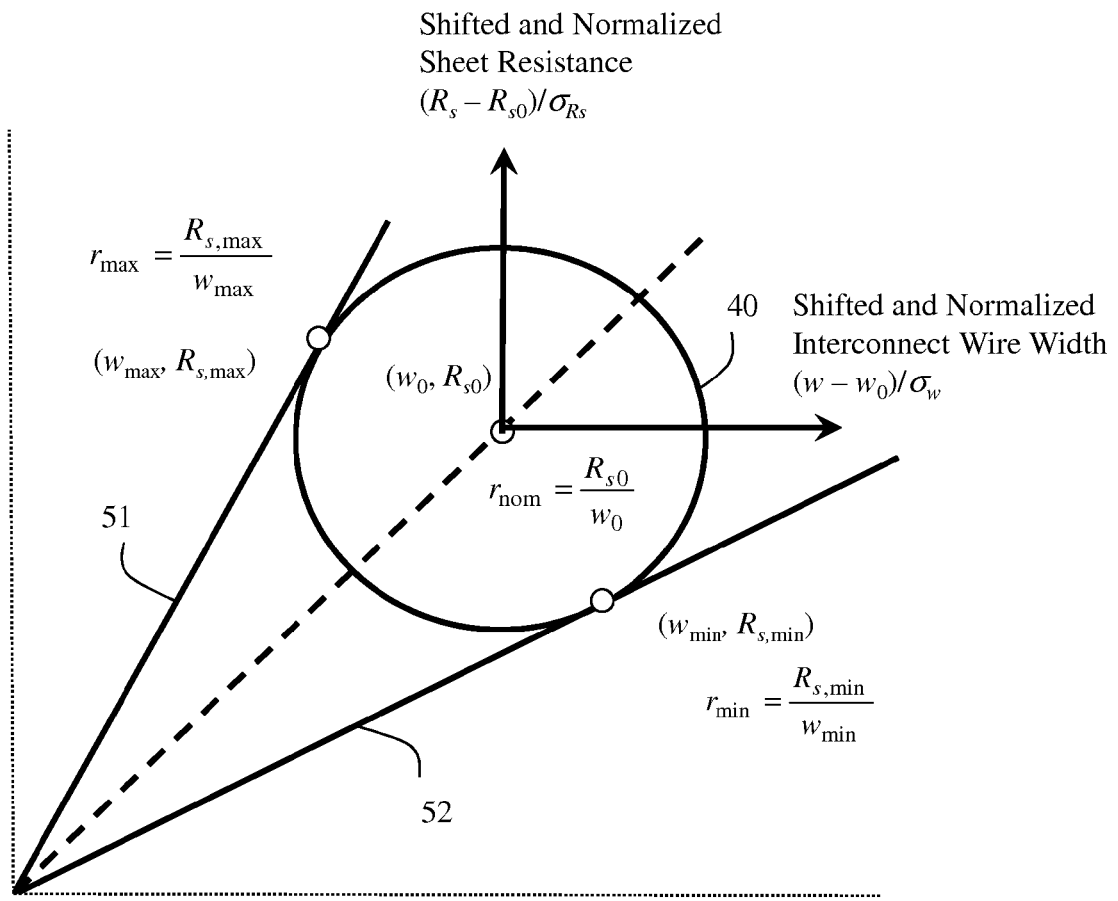
FIG. 5 is a graph illustrating the K$\sigma$ equal-probability-density surface $s(u_1, u_2, \ldots, u_M; K)=0$ of FIG. 4 with tangent lines indicating lower statistical bound $-K\sigma$ and upper statistical bound $+K\sigma$.

Specifically, to determine the lower and upper statistical bounds, a $K\sigma$ equal-probability-density surface $s(u_1, u_2, \ldots, u_M; K)=0$ of the second joint probability density function $P(u_1, u_2, \ldots, u_M)$ can be constructed (112). It should be noted that, geometrically, this equal-probability surface $s(u_1, u_2, \ldots, u_M; K)=0$ is a circle when M=2, or a sphere in the three-dimensional space $(u_1, u_2, u_3)$ when M=3, or a hypersphere in the M-dimensional space $(u_1, u_2, \ldots, u_M)$, $$\sum_{j=1}^{M} u_j^2 = K^2,$$

when M>3. Furthermore, the radius r of this circle or sphere is K and, thereby constant. For example, FIG. 4 illustrates a circle 40 $K\sigma$ equal-probability-density surface $s(u_1, u_2, \ldots, u_M; K)=0$ of the joint probability density function $P(u_1, u_2, \ldots, u_M)$ for a unit-length resistance r of an interconnect wire affected by two independent statistical model parameters: interconnect wire width (w) and sheet resistance ($R_s$). The circle 40 is centered at $(w_0, R_{s0})$ and the radius of this circle is K. An implication here is that each normalized parameter $u_j$ is allowed to vary within the range of $[-K, +K]$ at most (i.e., $-K \leq u_j \leq K$, $j=1, 2, \ldots, M$). Furthermore, if the first (j−1) normalized parameters $(u_1, u_2, \ldots, u_M)$ are already specified, then the variation range of the jth normalized parameter $u_j$ is further restricted, as follows:

$$|u_j| \leq \sqrt{K^2 - \sum_{i=1}^{j-1} u_i^2},$$

j=2, 3, . . . , M. Then, a constrained optimization problem can be solved on the Kσ equal-probability-density surface $s(u_1, u_2, \ldots, u_M; K)=0$ to determine the lower statistical bound −Kσ and the upper statistical bound +Kσ (114). Solving the constrained optimization problem at process 114 comprises minimizing the performance target F under the constraint $$\sum_{j=1}^{M} u_j^2 = K^2$$

to determine the lower statistical bound −Kσ and similarly maximizing the performance target F under the constraint $$\sum_{j=1}^{M} u_j^2 = K^2$$

to determine the upper statistical bound +Kσ. As illustrated in FIG. 5, maximizing the unit-length resistance r under the constraint of being on the circle 40 leads to one of the tangent lines 51 to the circle 40 and minimizing the unit-length resistance r under the constraint of being on the circle 40 leads to the other tangent line 52 of the circle 40.

Those skilled in the art will recognize that solving such a constrained optimization problem directly can be quite complex. To avoid this complexity, the constrained optimization problem can first be converted into an unconstrained optimization problem. Different techniques can be used for this conversion process.

For example, the constrained optimization problem can be converted into an unconstrained optimization problem by eliminating one of the M normalized parameters $(u_1, u_2, \ldots, u_M)$, such as the $n^{th}$ parameter such that $$u_n = \pm \sqrt{K^2 - \sum_{j=1, j \neq n}^{M} u_j^2},$$

n=1, 2, 3, . . . , M (118). The plus sign (+) is for one of the upper and the lower bounds, and the minus sign (−) is for the other bound. Then, the unconstrained optimization problem can be solved by minimizing the performance target F without the constraint to determine the lower statistical bound −Kσ and maximizing the performance target F without the constraint to determine the upper statistical bound +Kσ (124). For example, if the last normalized parameter is eliminated, then the problem becomes $$F_- = f\left(u_1, u_2, \ldots, u_{M-1}, \mp \sqrt{K^2 - \sum_{j=1}^{M-1} u_j^2}\right)$$

for minimizing the performance target F and $$F_+ = f\left(u_1, u_2, \ldots, u_{M-1}, \pm \sqrt{K^2 - \sum_{j=1}^{M-1} u_j^2}\right)$$

for maximizing the performance target F. Each of these is an optimization problem in the (M−1) dimensional space.

Alternatively, the constrained optimization problem can be converted into an unconstrained optimization problem by adding an additional parameter to the M normalized parameters $(u_1, u_2, \ldots, u_M)$ (120). This can be done to minimize or maximize the following target function in an (M+1) dimensional space:

$$T(u_1, u_2, \ldots, u_M, \lambda) = f(u_1, u_2, \ldots, u_M) - \frac{1}{2}\lambda\left(\sum_{j=1}^{M} u_j^2 - K^2\right).$$

It should be noted that, in this case, setting the partial derivative of T with respect to λ to zero, leads to $$\frac{\partial T}{\partial \lambda} = -\frac{1}{2}\left(\sum_{j=1}^{M} u_j^2 - K^2\right) = 0.$$

Then, the unconstrained optimization problem can be solved by minimizing the performance target F without the constraint to determine the lower statistical bound −Kσ and maximizing the performance target F without the constraint to determine the upper statistical bound +Kσ (124).

Finally, since, as mentioned above, when the parameters are normalized, the geometric shape of the equal-probability surface is a circle or sphere with a constant radius r equal to K, the constrained optimization problem can also be converted into an unconstrained optimization problem by replacing the M normalized parameters $(u_1, u_2, \ldots, u_M)$ with a set of angle variables comprising (M−1) angle variables (122). For example, in the case of M=2: $u_1=K \cos \phi_1$, $u_2=K \sin \phi_1$, $0 \leq \phi_1 2\pi$. In the case of M=3: $u_1=K \cos \phi_1$, $u_2=K \sin \phi_1 \cos \phi_2$, $u_3=K \sin \phi_1 \sin \phi_2$, $0 \leq \phi_1 \leq \pi$, $0 \leq \phi_2 \leq 2\pi$. In the case of M=4, $u_1=K \cos \phi_1$, $u_2=K \sin \phi_1 \cos \phi_2$, $u_3=K \sin \phi_1 \sin \phi_2 \cos \phi_3$, $u_4=K \sin \phi_1 \sin \phi_2 \sin \phi_3$. Thus, in general, $u_1=K \cos \phi_1, \ldots,$ $$u_i = K(\cos\phi_i)\prod_{j=1}^{i-1} \sin\phi_j,$$

i=2, 3, . . . , M−1, . . . , $$u_M = K\prod_{j=1}^{M-1} \sin\phi_j.$$

After replacing the M normalized parameters $(u_1, u_2, \ldots, u_M)$ with a set of (M−1) angle variables, the problems becomes an unconstrained optimization in the (M−1) dimensional space. Then, the unconstrained optimization problem can be solved by minimizing the performance target F without the constraint to determine the lower statistical bound −Kσ and maximizing the performance target F without the constraint to determine the upper statistical bound +Kσ (124).

Figure 6:
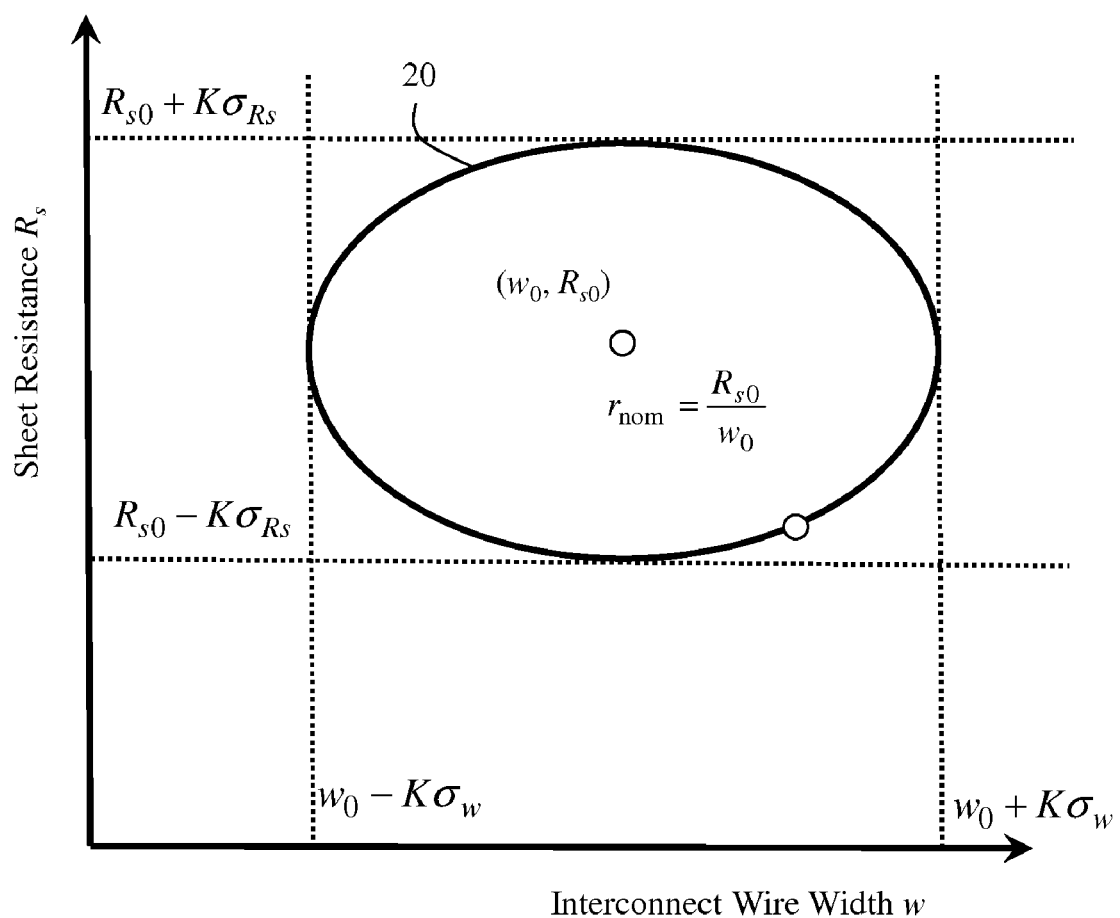
FIG. 6 is a graph illustrating the corresponding parameter corner values on the K$\sigma$ equal-probability-density surface $S(x_1, x_2, \ldots, x_M; K)=0$ of FIG. 2.

It should be noted that, in each of the above-described method embodiments, the process of solving the unconstrained optimization problem can lead to, not only finding the corresponding minimum and maximum function values $F_c$, $F(x_{1,c}, x_{2,c}, \ldots, x_{M,c})=F_c$ at process 124, but also to finding a set of corresponding final variable values $(x_{1,c}, x_{2,c}, \ldots, x_{M,c})$ for the M independent statistical model parameters $(x_1, x_2, \ldots, x_M)$. These corresponding final variable values are the corner parameter values. For example, FIG. 6 illustrates the K$\sigma$ ranges (e.g., where K=3) for the interconnect wire width w and the sheet resistance $R_s$ on the ellipse 20 and, thereby indicates the corresponding parameter values for w and $R_s$.

It should be noted that the initial parameter values for starting an optimization searching process can be obtained using the gradient direction of the performance target function $f$ at its nominal point, which in the case of a normalized parameter is $$u_j = \eta \frac{\partial f(0, 0, \ldots, 0)}{\partial u_j},$$

j=1, 2, ..., M, where $\eta$ is a normalization constant determined by the constraint $$\sum_{j=1}^{M} u_j^2 = K^2.$$

Figure 7:
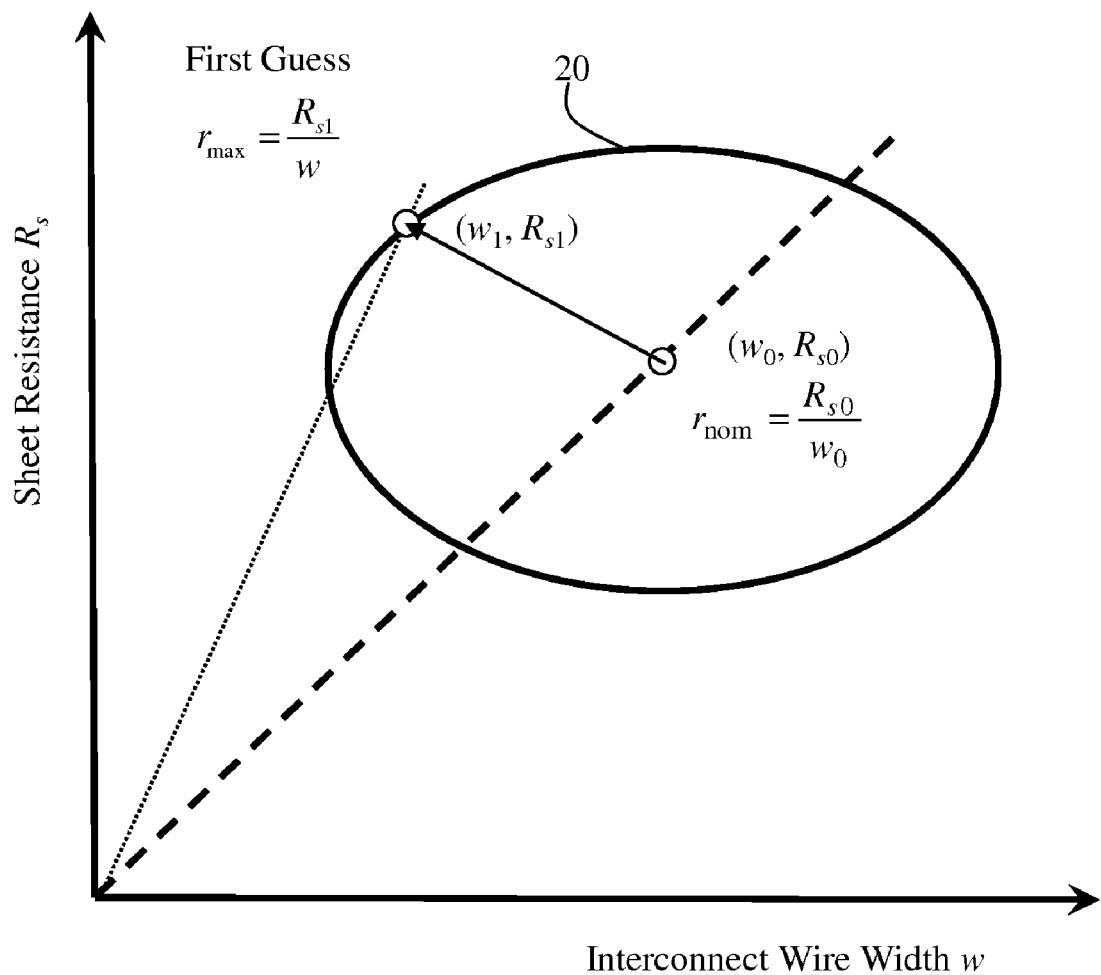
FIG. 7 is a graph illustrating the initial starting point for searching the upper statistical bound $+K\sigma$ on the K$\sigma$ equal-probability-density surface $S(x_1, x_2, \ldots, x_M; K)=0$ of FIG. 2.
Figure 8:
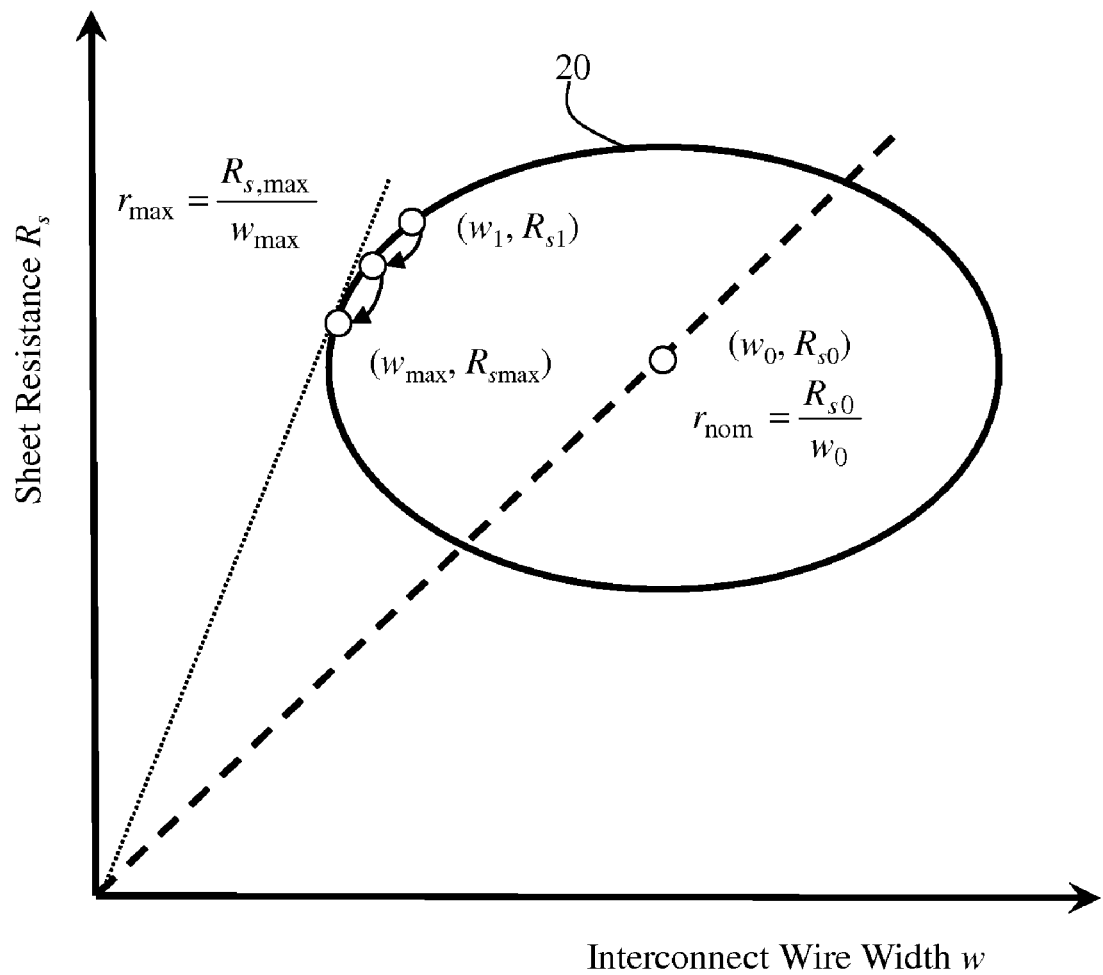
FIG. 8 is a graph illustrating a maximization process from the initial starting point shown in FIG. 7.

For example, as illustrated in FIG. 7, an initial starting point can be obtained using the gradient. That is, the first guess as to the K$\sigma$ (e.g., where K=3) upper (or lower) bound of the unit-length resistance r is based on the gradient direction of the resistance at its nominal point. FIG. 8 illustrates subsequent maximization of the unit-length resistance r along the ellipse leads to $r_{max}$ and corresponding parameter values $(w_{max}, R_{s,max})$. Techniques for finding the minimum and/or maximum value of a multi-variable unconstrained optimization function and, at the same time, finding the corresponding variable values, are well known in the art. Thus, the details are omitted from this specification in order to allow the reader to focus on the salient aspects of the embodiments described.

Figure 9:
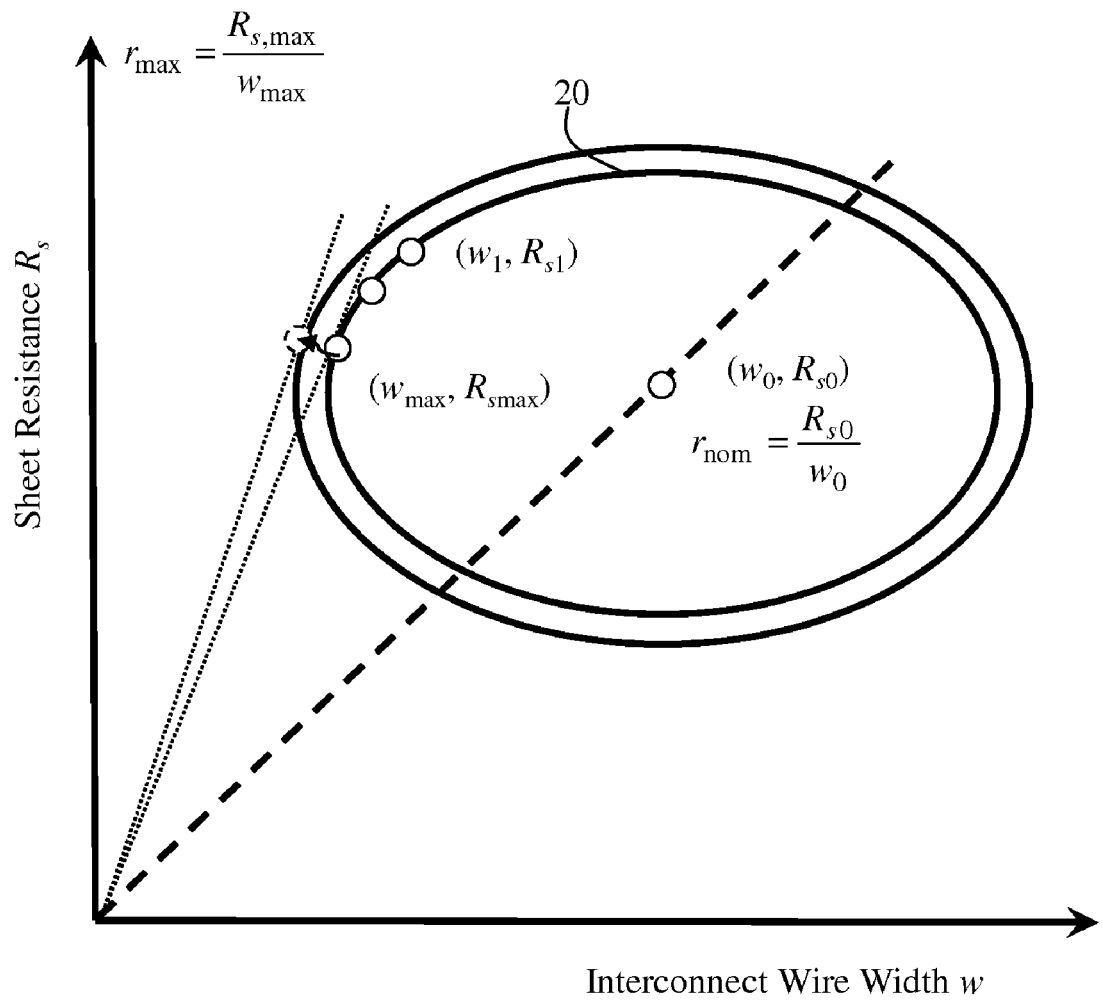
FIG. 9 is a graph illustrating the K$\sigma$ equal-probability-density surface $S(x_1, x_2, \ldots, x_M; K)=0$ of FIG. 2 overlaid with an additional K$\sigma$ equal-probability-density surface $S(x_1, x_2, \ldots, x_M; K)=0$ based on a different but, close in value, K.

As mentioned above, in each of the method embodiments described above, the value of K is preselected so that a pair of given percentages of accumulated probability density for the performance target F will fall within the symmetric interval of from −K$\sigma$ to +K$\sigma$. For example, K=3.0 can be used to find the 0.135% to 99.865% statistical bounds, K=2.33 can be used to find the 1% to 99% statistical bounds, K=1.64 can be used to find the 5% to 95% statistical bounds, K=1.28 can be used to find the 10% to 90% statistical bounds, K=0.842 can be used to find the 20% to 80% statistical bounds, K=0.524 can be used to find the 30% to 70% statistical bounds, and K=0.253 can be used to find the 40% to 60% statistical bounds. Optionally, after the lower statistical bound corresponding to −K$\sigma$ and the upper statistical bound corresponding to +K$\sigma$ are determined for one value for K, different statistical bounds for the performance target F can be repeatedly determined using a range of values for K that are between 0 and at least 3 (e.g., 3, 4, 5, etc.) and that vary in relatively small increments from one value of K to another value of K (126). For example, if the first value of K was 3, different statistical bounds for the performance target F can be determined for lower K values 2.9, 2.8, 2.7, 2.6, ..., to 0 and higher K values 3.1, 3.2, 3.4 to 4. This process can be fairly quick and simple, as illustrated in FIG. 9. That is, after finding the statistical bounds (e.g., $r_{min}$ and/or $r_{max}$) for one K value, those statistical bounds can be used as the starting point for finding the statistical bounds for another, close in value, K and so on. Based on these different statistical bounds, an accumulated probability density (APD) function can be constructed for the performance target F (126). This can be accomplished by first obtaining a APD relative to K, as obtained from a Gaussian distribution and then plotting APD(−K) relative to $F_c$(lower, K) and plotting APD(K) relative to $F_c$(upper, K) together. Then, a probability density function (PDF) can be generated for the performance target F by taking a finite difference of the accumulated probability density function around each of the different statistical bounds and, more particularly, around each lower and upper corner value of the performance target F (126).

Figure 10:
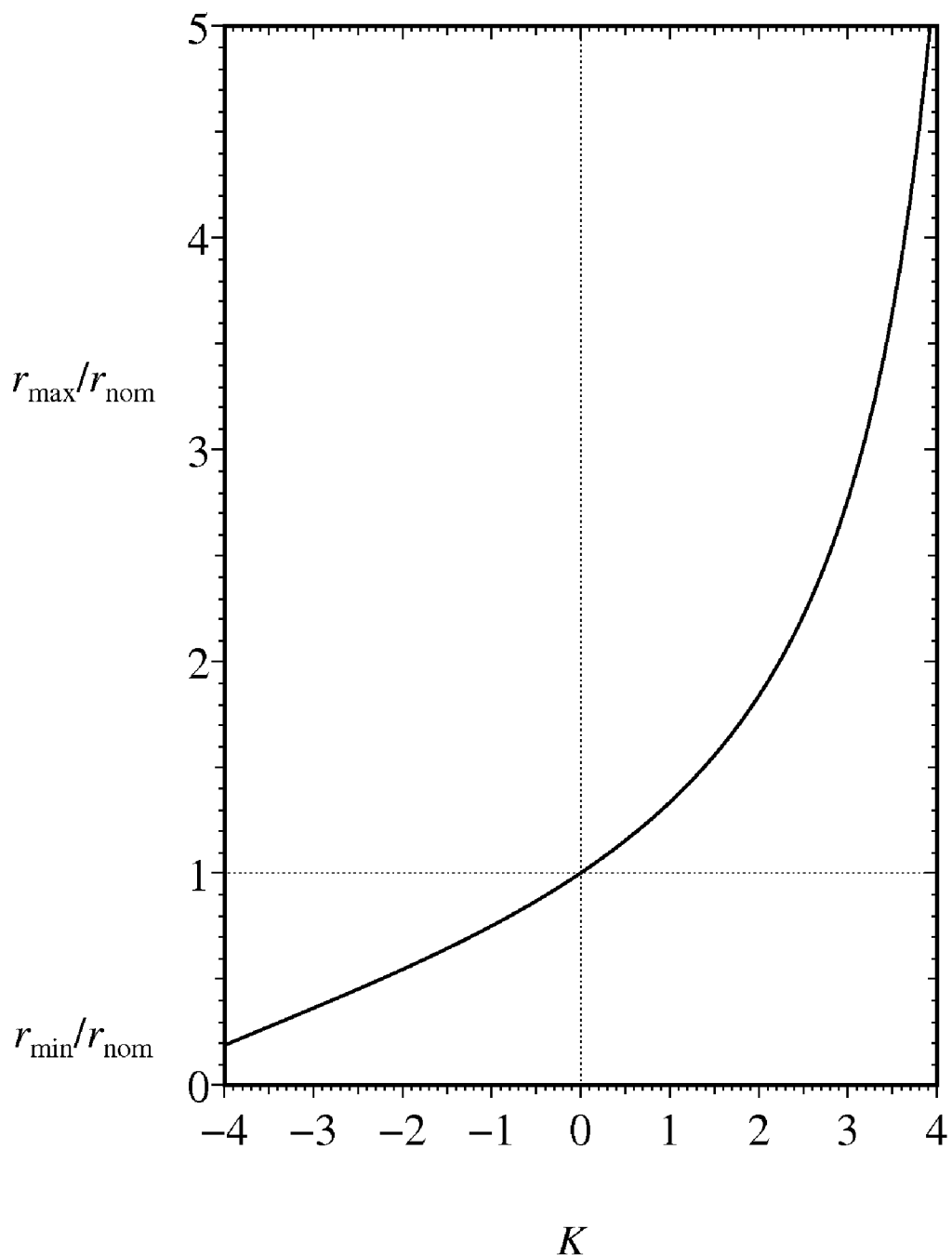
FIG. 10 is a graph illustrating K-sigma maximum resistance value $r_{max}$ relative to K and K-sigma minimum resistance value $r_{min}$ relative to K.
Figure 11:
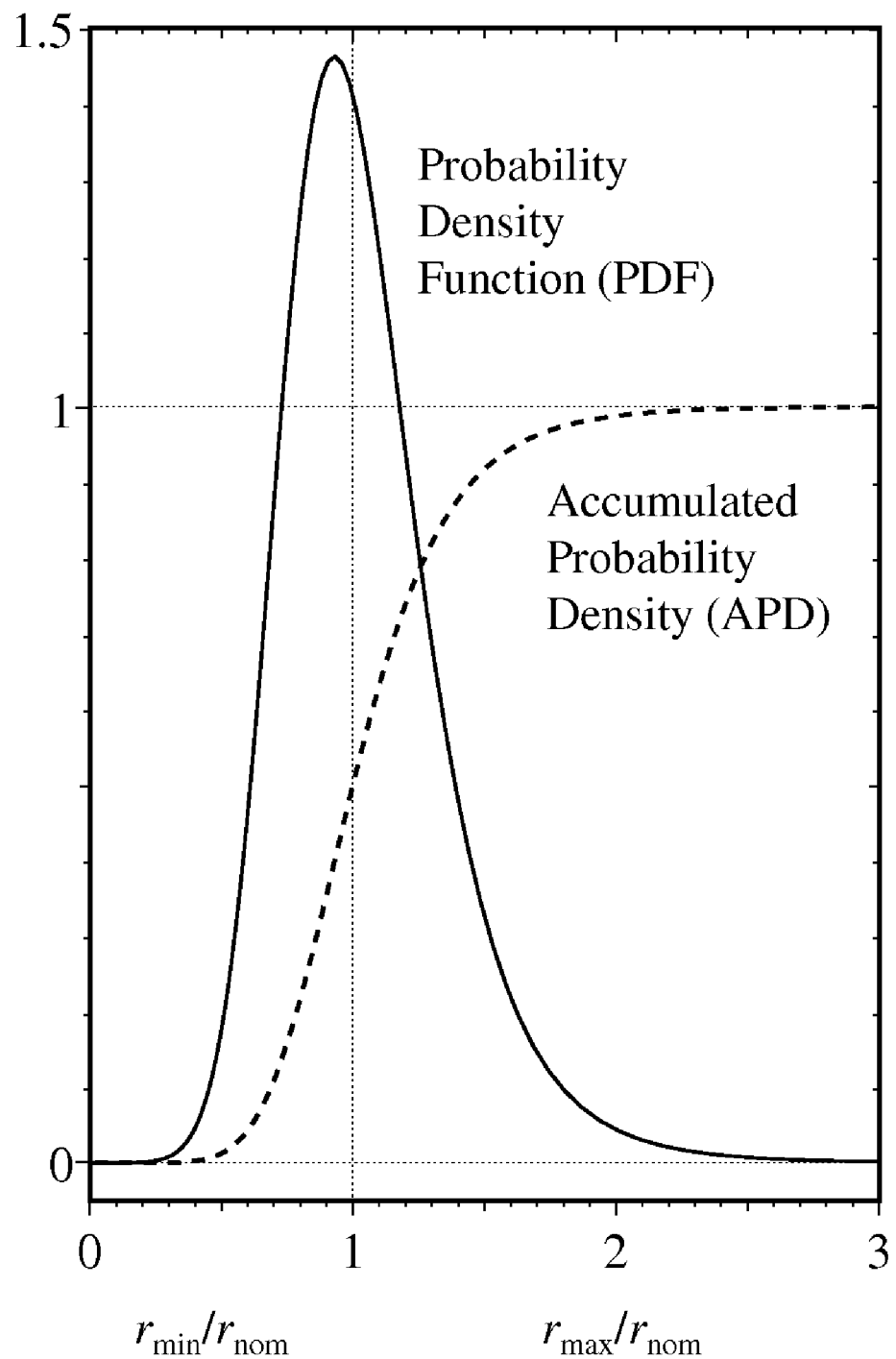
FIG. 11 is a graph illustrating an exemplary probability density function (PDF) and accumulated probability density (APD) function.

For example, to obtain an accumulated probability density (APD) and a corresponding probability density function (PDF) of a unit-length resistance r problem, where r=$R_s$/w. The ratio of $\sigma_{Rs}/R_{s0}$ is 20%, and the ratio of $\sigma_w/w_0$ is also 20% here. FIG. 10 illustrates a plot of K-sigma maximum resistance value $r_{max}$ relative to K and K-sigma minimum resistance value $r_{min}$ relative to K. FIG. 11 illustrates a plot of the probability density function (PDF) relative to K, as obtained from the Gaussian distribution. FIG. 11 further illustrates a plot of the accumulated probability density (APD) relative to the resistance corner values. The PDF at a given resistance corner value is obtained by using a finite difference method around the given resistance corner value. For example, PDF $((K_1+K_2)/2)=[APD(K_2)-APD(K_1)]/[r_{max}(K_2)-r_{max}(K_1)]$ for a maximum resistance corner, and PDF$((K_1+K_2)/2)=[APD(K_2)-APD(K_1)]/[r_{min}(K_2)-r_{min}(K_1)]$ for a minimum resistance corner.

In addition to finding the statistical bounds of a single performance target for a circuit or, specifically, of a component thereof, the method embodiments described above can also optionally be used to find the statistical bounds of multiple different performance targets, where the performance targets are affected by at least one common statistical model parameter. To do this, the statistical bounds for each of the multiple different performance targets are separately determined (128). Then, a set of solutions for a set of equations is searched to find a common model parameter corner (128). More specifically, after obtaining a statistical bound $F_{i,c}$ for each performance target, a set of solutions for a set of equations, one for each of multiple performance targets $F_i$, i=1, 2, ..., N, can be searched in order to find a common model parameter corner $(x_{1,c}, x_{2,c}, \ldots, x_{M,c})$ by $F_i(x_{1,c}, x_{2,c}, \ldots, x_{M,c})=F_{i,c}$, i=1, 2, ..., N.

For example, performance targets of interconnect resistance R and interconnect capacitance C are affected by common statistical model parameters: wire width w and wire thickness t. Specifically, interconnect resistance R is a function of wire width w ($=x_1$) and wire thickness t ($=x_2$), where R=$F_1$(w, t). Interconnect capacitance C is a function of wire width w, wire thickness t, line-to-line space $s_L$ and $s_R$, interlevel distance (ILD) to the metal level above d ($=x_3$), and interlevel distance h (to the metal level below) h ($=x_4$). At a set of given wire design width and line-to-line design space, the statistical variations of $s_L$ and $s_R$ are not independent, but are linked to the statistical variation of wire width t. Thus, in terms of independent statistical model parameters, C=$F_2$(w, t, d, h).

Figure 12:
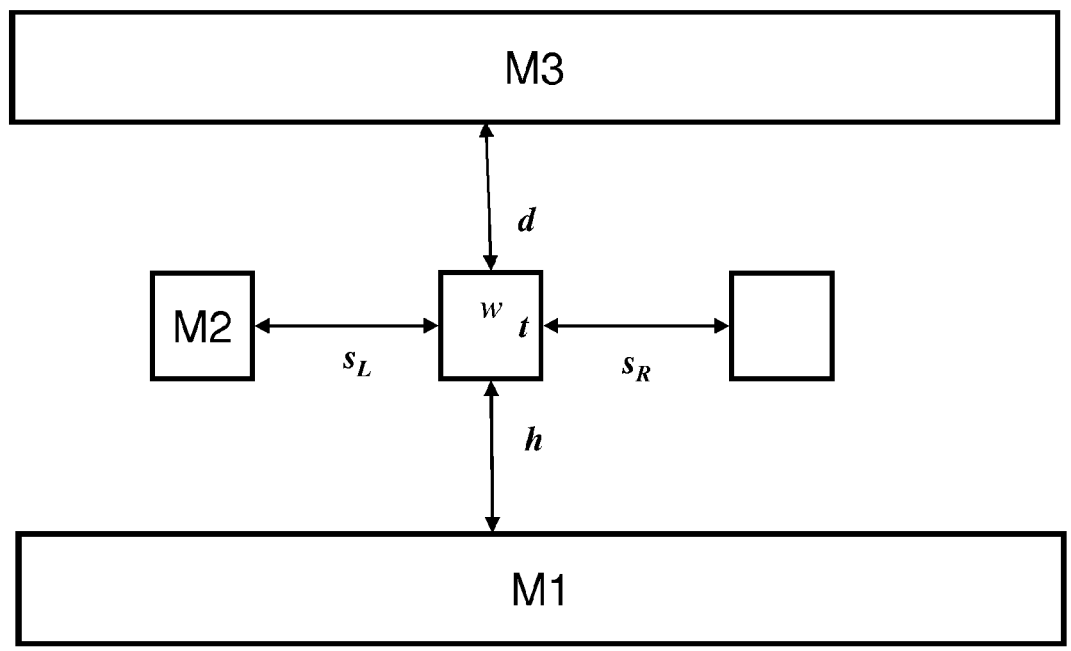
FIG. 12 is a diagram illustrating common model parameters affecting two different performance targets.

Referring to FIG. 12, interconnect resistance decreases with increasing wire width w and/or increasing wire thickness t, but interconnect capacitance increases with increasing wire width w and/or increasing wire thickness t (as well as decreasing interlevel separations $h_A$ and $h_B$). So, a 3-sigma minimum value $R_{min}$ of the wire resistance can be found by minimizing the equation $R=F_1(w, t)$ under the constraint, thereby obtaining $F_1(w_a, t_a)=R_{min}\equiv F_{1,c}$. Similarly, a 3-sigma maximum value $C_{max}$ of wire capacitance can be found by maximizing the equation $C=F_2(w, t, d, h)$ under the constraint, thereby obtaining $F_2(W_b, t_b, d_b, h_b)=C_{max}\equiv F_{2,c}$. To find a common model parameter corner $(w_c, t_c, d_c, h_c)$, the following set of equations must be solved simultaneously: $F_1(w_c, t_c)=R_{min}\equiv F_{1,c}$ and $F_2(w_c, t_c, d_c, h_c)=C_{max}\equiv F_{2,c}$.

As described above, the embodiments of the present invention include method and computer program product embodiments. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "computer system." Furthermore, aspects of the present invention may take the form of a computer program product embodied in one or more computer readable medium(s) having computer readable program code embodied thereon.

Figure 13:
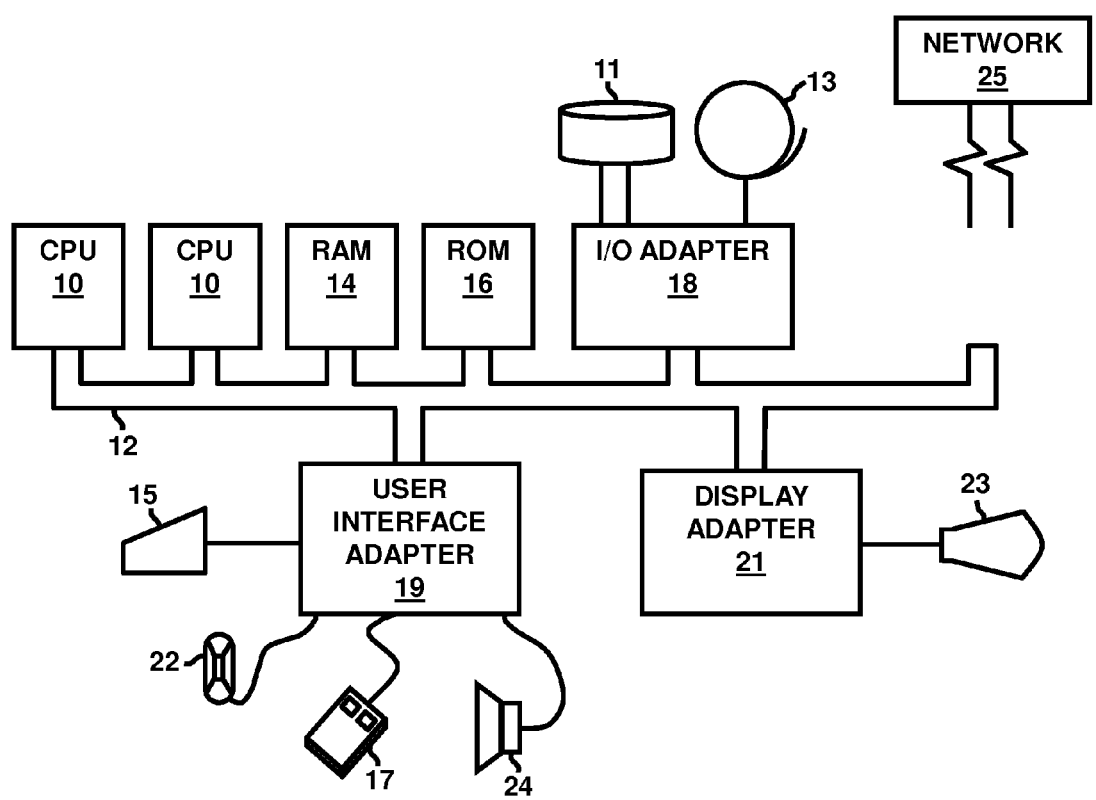
FIG. 13 is a schematic diagram illustrating an exemplary hardware environment that can be used to implement the embodiments of the invention.

A representative hardware environment for practicing the embodiments of the invention is depicted in FIG. 13. This schematic drawing illustrates a hardware configuration of an information handling/computer system that can be configured to perform the various method steps described above and illustrated in the flowchart and/or block diagrams. The computer system can comprise at least one processor or central processing unit (CPU) 10. The CPUs 10 can be interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read inventive instructions on the program storage devices and can follow these instructions to execute the above-described method embodiments. The system can further include a user interface adapter 19 that connects a keyboard 15, mouse 17, speaker 24, microphone 22, and/or other user interface devices such as a touch screen device (not shown) to the bus 12 to gather user input. Additionally, a communication adapter 20 can connect the bus 12 to a data processing network 25, and a display adapter 21 can connect the bus 12 to a display device 23, which may be embodied as an output device (e.g., a monitor, printer, or transmitter) for outputting information. Such information can include, but is not limited to, a report indicating the statistical bounds, corresponding parameter corners, and/or the probability density function of one or more performance targets for a circuit or component thereof.

As mentioned above, aspects of the present invention may also take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (e.g., the computer system of FIG. 13), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to method flowchart and/or block diagrams, computer systems and computer program products. It will be understood that each block of the flowchart and/or block diagrams, and combinations of blocks in the flowchart and/or block diagrams, can be implemented by computer program instructions. These computer program instructions may be provided to a processor of a general purpose computer (e.g., the computer system of FIG. 13), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be understood that the flowchart and block diagrams in the Figures illustrate the architecture, functionality, and operation of possible implementations of systems, methods and computer program products according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should further be understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Finally, it should be understood that the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Therefore, disclosed above are embodiments of a computer-implemented method and associated computer program product for efficiently and accurately finding the lower and upper statistical bounds (e.g., 0.135% to 99.865%, 1% to 99%, 5% to 95%, 10% to 90%, 20% to 80%, 30% to 70%, 40% to 60%, etc.), the corresponding parameter corners and the probability density function of one or more performance targets for a circuit without requiring Monte Carlo simulation runs. For example, the method can be used to find one or more specific performance targets of a specific circuit component, such as an integrated circuit, a semiconductor device, an interconnect structure, etc.

To accomplish this, a joint probability density function for independent parameters that affect the performance target can be constructed. Then, based on the joint probability density function, a pair of statistical bounds of the performance target can be found by constructing a proper equal-probability-density surface of the joint probability density function and solving a constrained optimization problem on that equal-probability-density surface. Once the statistical bounds are determined, the corresponding parameter corners (i.e., the off-set) for the performance target can also be determined. After multiple pairs of statistical bounds for multiple different equal-probability-density surfaces are determined, an accumulated probability density of the performance target can be determined. Lastly, the corresponding probability density function can be determined.

These embodiments can be used to generate corner models in process design kits (PDKs) and in compact models, can be used in technology computer aided design (TCAD) tools, other simulation tools, etc. These embodiments are advantageous over prior art techniques for finding the lower and upper statistical bounds of performance target(s) of a circuit and, specifically, of specific performance target(s) of a specific circuit component (e.g., an integrated circuit, a semiconductor device, an interconnect structure, etc.) because of the simulation time saved and also the fact that corresponding parameter corners are simultaneously determined. Furthermore, there are no prior-art techniques for finding a statistical (or probability) distribution function of an arbitrarily given performance target without statistical or Monte Carlo simulations.

What is claimed is:

1. A method of finding statistical bounds for a performance target F of a circuit affected by M independent statistical model parameters $(x_1, x_2, \ldots, x_M)$, where M is an integer, said method comprising:

determining, by a computer, a nominal value $x_{j0}$, a standard deviation $\sigma_j$, and a probability density function $\tilde{p}(x_j; x_{j0}, \sigma_j)$ for each parameter $x_j$, where $j=1, 2, \ldots, M$;

constructing, by said computer, a joint probability density function $\tilde{P}(x_1, x_2, \ldots, x_M)$, for all of said M independent statistical model parameters $(x_1, x_2, \ldots, x_M)$, where $$\tilde{P}(x_1, x_2, \ldots, x_M) = \prod_{j=1}^{M} \tilde{p}(x_j; x_{j0}, \sigma_j);$$

and, based on said joint probability density function $\tilde{P}(x_1, x_2, \ldots, x_M)$, determining, by said computer, said statistical bounds of said performance target F as defined by a symmetric interval from a lower statistical bound $-K\sigma$ to an upper statistical bound $+K\sigma$ by performing the following:

constructing a $K\sigma$ equal-probability-density surface $S(x_1, x_2, \ldots, x_M; K)=0$ of said joint probability density function $\tilde{P}(x_1, x_2, \ldots, x_M)$, and solving a constrained optimization problem on said $K\sigma$ equal-probability-density surface $S(x_1, x_2, \ldots, x_M; K)=0$ to determine said lower statistical bound $-K\sigma$ and said upper statistical bound $+K\sigma$.

2. The method of claim 1, said solving of said constrained optimization problem comprising:

minimizing said performance target F under a constraint to determine said lower statistical bound $-K\sigma$; and maximizing said performance target F under said constraint to determine said upper statistical bound +Kσ, said constraint comprising:

$$\sum_{j=1}^{M}(x_j - x_{j0})^2/\sigma_j^2 = K^2.$$

3. The method of claim 2, said solving of said constrained optimization problem comprising:
converting said constrained optimization problem to an unconstrained optimization problem by eliminating one of said M independent statistical model parameters ($x_1$, $x_2$, ..., $x_M$); and
after said converting, minimizing said performance target F without said constraint to determine said lower statistical bound –Kσ and maximizing said performance target F without said constraint to determine said upper statistical bound +Kσ.

4. The method of claim 2, said solving of said constrained optimization problem comprising:
converting said constrained optimization problem to an unconstrained optimization problem by adding an additional parameter to said M independent statistical model parameters; and
after said converting, minimizing said performance target F without said constraint to determine said lower statistical bound –Kσ and maximizing said performance target F without said constraint to determine said upper statistical bound +Kσ.

5. The method of claim 2, further comprising determining, by said computer, a set of final values $x_{1,c}$, $x_{2,c}$, ..., $x_{M,c}$ for said M independent statistical model parameters ($x_1$, $x_2$, ..., $x_M$), and further determining corresponding minimum and maximum function values $F_c$, $F(x_{1,c}, x_{2,c}, ..., x_{M,c})=F_c$.

6. The method of claim 1, wherein a value of K is preselected so that a pair of given percentages of accumulated probability density for said performance target F fall within said symmetric interval from –Kσ to +Kσ.

7. The method of claim 6, further comprising: after determining said lower statistical bound –Kσ and said upper statistical bound +Kσ using said value of K, repeatedly determining, by said computer, different statistical bounds for said performance target F using a range of values for K that are between 0 and at least 3 and that vary in relatively small increments from one value of K to another value of K; based on said different statistical bounds, constructing, by said computer, an accumulated probability density function for said performance target F; and generating, by said computer, a probability density function for said performance target F by taking a finite difference of said accumulated probability density function around each of said different statistical bounds.

8. The method of claim 1, further comprising, for multiple different performance targets affected by at least one common statistical model parameter, separately determining, by said computer, statistical bounds for each of said multiple different performance targets and, searching, by said computer, a set of solutions for a set of equations to find a common model parameter corner.

9. The method of claim 1, wherein, when M=2, said Kσ equal-probability-density surface $S(x_1, x_2, ..., x_M; K)=0$ comprises an ellipse and, when M=3, said Kσ equal-probability-density surface $S(x_1, x_2, ..., x_M; K)=0$ comprises an ellipsoid.

10. A method of finding statistical bounds for a performance target F of a circuit affected by M independent statistical model parameters ($x_1$, $x_2$, ..., $x_M$), where M is an integer, said method comprising:
determining, by a computer, a nominal value $x_{j0}$, a standard deviation $\sigma_j$, and a probability density function $\tilde{p}(x_j; x_{j0}, \sigma_j)$ for each parameter $x_j$, where j=1, 2, ..., M;
normalizing, by said computer, said M independent statistical model parameters ($x_1$, $x_2$, ..., $x_M$) to create M normalized parameters ($u_1$, $u_2$, ..., $u_M$);
constructing, by said computer, a joint probability density function $P(u_1, u_2, ..., u_M)$ for all of said M normalized parameters ($u_1$, $u_2$, ..., $u_M$), where $$P(u_1, y_2, ..., u_M) = \prod_{j=1}^{M} p(u_j) \text{ and } u_j = (x_j - x_{j0})/\sigma_j;$$

and,
based on said joint probability density function $P(u_1, u_2, ..., u_M)$, determining, by said computer, said statistical bounds of said performance target F as defined by a symmetric interval from a lower statistical bound –Kσ to an upper statistical bound +Kσ by performing the following:
constructing a Kσ equal-probability-density surface $s(u_1, u_2, ..., u_M; K)=0$ of said second joint probability density function $P(u_1, u_2, ..., u_M)$; and
solving a constrained optimization problem on said Kσ equal-probability-density surface $s(u_1, u_2, ..., u_M; K)=0$ to determine said lower statistical bound –Kσ and said upper statistical bound +Kσ.

11. The method of claim 10, said solving of said constrained optimization problem comprising:
minimizing said performance target F under a constraint to determine said lower statistical bound –Kσ; and
maximizing said performance target F under said constraint to determine said upper statistical bound +Kσ, said constraint comprising:

$$\sum_{j=1}^{M} u_j^2 = K^2.$$

12. The method of claim 11, said solving of said constrained optimization problem comprising:
converting said constrained optimization problem to an unconstrained optimization problem by eliminating one of said M normalized parameters ($u_1$, $u_2$, ..., $u_M$); and
after said converting, minimizing said performance target F without said constraint to determine said lower statistical bound –Kσ and maximizing said performance target F without said constraint to determine said upper statistical bound +Kσ.

13. The method of claim 11, said solving of said constrained optimization problem comprising:
converting said constrained optimization problem to an unconstrained optimization problem by replacing said M normalized parameters ($u_1$, $u_2$, ..., $u_M$) with a set of angle variables comprising (M−1) angle variables; and
after said converting, minimizing said performance target F without said constraint to determine said lower statistical bound –Kσ and maximizing said performance target F without said constraint to determine said upper statistical bound +Kσ.

14. The method of claim 11, said solving of said constrained optimization problem comprising:
   converting said constrained optimization problem to an unconstrained optimization problem by adding an additional parameter to said M normalized parameters; and
   after said converting, minimizing said performance target F without said constraint to determine said lower statistical bound $-K\sigma$ and maximizing said performance target F without said constraint to determine said upper statistical bound $+K\sigma$.

15. The method of claim 10, further comprising determining, by said computer, a set of final values $x_{1,c}, x_{2,c}, \ldots, x_{M,c}$ for said M independent statistical model parameters $(x_1, x_2, \ldots, x_M)$, and further determining corresponding minimum and maximum function values $F_c$, $F(x_{1,c}, x_{2,c}, \ldots, x_{M,c}) = F_c$.

16. The method of claim 10, wherein a value of K is preselected so that given percentages of accumulated probability density for said performance target F fall within said symmetric interval from $-K\sigma$ to $+K\sigma$.

17. The method of claim 16, further comprising: after determining said lower statistical bound $-K\sigma$ and said upper statistical bound $+K\sigma$ using said value for K,
   repeatedly determining, by said computer, different statistical bounds for said performance target F using a range of values for K that are between 0 and at least 3 and that vary in relatively small increments from one value of K to another value of K;
   based on said different statistical bounds, constructing, by said computer, an accumulated probability density function for said performance target F; and
   generating, by said computer, a probability density function for said performance target F by taking a finite difference of said accumulated probability density function around each of said different statistical bounds.

18. The method of claim 10, further comprising, for multiple different performance targets affected by at least one common statistical model parameter, separately determining, by said computer, statistical bounds for each of said multiple different performance targets and, searching, by said computer, a set of solutions for a set of equations to find a common model parameter corner.

19. The method of claim 10, wherein, when M=2, said $K\sigma$ equal-probability-density surface $s(u_1, u_2, \ldots, u_M; K)=0$ comprises a circle and, when M=3, said $K\sigma$ equal-probability-density surface $s(u_1, u_2, \ldots, u_M; K)=0$ comprises a sphere.

20. A non-transitory computer readable storage medium having computer readable program code embodied therewith, said computer readable program code configured to perform a method of finding statistical bounds for a performance target F of a circuit affected by M independent statistical model parameters $(x_1, x_2, \ldots, x_M)$, where M is an integer, said method comprising:
   determining a nominal value $X_{j0}$, a standard deviation $\sigma_j$, and a probability density function $\tilde{p}(x_j, x_{j0}, \sigma_j)$ for each parameter $x_j$, where $j=1, 2, \ldots, M$;
   constructing a joint probability density function $\tilde{P}(x_1, x_2, \ldots, x_M)$, for all of said M independent statistical model parameters $(x_1, x_2, \ldots, x_M)$, where $$\tilde{P}(x_1, x_2, \ldots, x_M) = \prod_{j=1}^{M} \tilde{p}(x_j; x_{j0}, \sigma_j);$$

and, based on said joint probability density function $\tilde{P}(x_1, x_2, \ldots, x_M)$, determining, said statistical bounds of said performance target F as defined by a symmetric interval from a lower statistical bound $-K\sigma$ to an upper statistical bound $+K\sigma$ by performing the following:
   constructing a $K\sigma$ equal-probability-density surface $S(x_1, x_2, \ldots, x_M; K)=0$ of said joint probability density function $\tilde{P}(x_1, x_2, \ldots, x_M)$, and
   solving a constrained optimization problem on said $K\sigma$ equal-probability-density surface $S(x_1, x_2, \ldots, x_M; K)=0$ to determine said lower statistical bound $-K\sigma$ and said upper statistical bound $+K\sigma$.

21. A non-transitory computer readable storage medium having computer readable program code embodied therewith, said computer readable program code configured to perform a method of finding statistical bounds for a performance target F of a circuit affected by M independent statistical model parameters $(x_1, x_2, \ldots, x_M)$, where M is an integer, said method comprising:
   determining a nominal value $X_{j0}$, a standard deviation $\sigma_j$, and a probability density function $\tilde{p}(x_j, x_{j0}, \sigma_j)$ for each parameter $x_j$, where $j=1, 2, \ldots, M$;
   normalizing said M independent statistical model parameters $(x_1, x_2, \ldots, x_M)$ to create M normalized parameters $(u_1, u_2, \ldots, u_M)$;
   constructing a joint probability density function $P(u_1, u_2, \ldots, u_M)$, for all of said M normalized parameters $(u_1, u_2, \ldots, u_M)$, where $$P(u_1, y_2, \ldots, u_M) = \prod_{j=1}^{M} p(u_j); \text{ and } u_j = (x_j - x_{j0})/\sigma_j;$$

and, based on said joint probability density function $P(u_1, u_2, \ldots, u_M)$, determining, said statistical bounds of said performance target F as defined by a symmetric interval from a lower statistical bound $-K\sigma$ to an upper statistical bound $+K\sigma$ by performing the following:
   constructing a $K\sigma$ equal-probability-density surface $s(u_1, u_2, \ldots, u_M; K)=0$ of said joint probability density function $P(u_1, u_2, \ldots, u_M)$;
   solving a constrained optimization problem on said $K\sigma$ equal-probability-density surface $s(u_1, u_2, \ldots, u_M; K)=0$ to determine said lower statistical bound $-K\sigma$ and said upper statistical bound $+K\sigma$.

22. The computer program product of claim 21, said solving of said constrained optimization problem comprising:
   minimizing said performance target F under a constraint to determine said lower statistical bound $-K\sigma$; and
   maximizing said performance target F under said constraint to determine said upper statistical bound $+K\sigma$, said constraint comprising:

$$\sum_{j=1}^{M} u_j^2 = K^2.$$

23. The computer program product of claim 22, said solving of said constrained optimization problem comprising:
   converting said constrained optimization problem to an unconstrained optimization problem by eliminating one of said M normalized parameters $(u_1, u_2, \ldots, u_M)$; and
   after said converting, minimizing said performance target F without said constraint to determine said lower statistical bound $-K\sigma$ and maximizing said performance target F without said constraint to determine said upper statistical bound $+K\sigma$.

24. The computer program product of claim 22, said solving of said constrained optimization problem comprising:

converting said constrained optimization problem to an unconstrained optimization problem by replacing said M normalized parameters $(u_1, u_2, \ldots, u_M)$ with a set of angle variables comprising (M−1) angle variables; and after said converting, minimizing said performance target F without said constraint to determine said lower statistical bound −Kσ and maximizing said performance target F without said constraint to determine said upper statistical bound +Kσ.

25. The computer program product of claim 22, said solving of said constrained optimization problem comprising:

converting said constrained optimization problem to an unconstrained optimization problem by adding an additional parameter to said M normalized parameters; and after said converting, minimizing said performance target F without said constraint to determine said lower statistical bound −Kσ and maximizing said performance target F without said constraint to determine said upper statistical bound +Kσ.

\* \* \* \* \*